United States Patent
Lan et al.

(10) Patent No.: US 10,361,036 B2
(45) Date of Patent: Jul. 23, 2019

(54) CAPACITOR PACKAGE STRUCTURE

(71) Applicant: APAQ TECHNOLOGY CO., LTD., Miaoli County (TW)

(72) Inventors: Shang-Che Lan, Kaohsiung (TW); Yi-Liang Chen, Changhua County (TW); Ming-Tsung Chen, Changhua County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 0 days.

(21) Appl. No.: 15/823,526

(22) Filed: Nov. 27, 2017

(65) Prior Publication Data
US 2018/0254148 A1  Sep. 6, 2018

(30) Foreign Application Priority Data
Mar. 1, 2017 (TW) .............................. 106106662 A

(51) Int. Cl.
| | |
|---|---|
| *H01G 9/08* | (2006.01) |
| *H01G 4/33* | (2006.01) |
| *H01G 2/10* | (2006.01) |
| *H01G 2/12* | (2006.01) |

(52) U.S. Cl.
CPC ............. *H01G 4/33* (2013.01); *H01G 2/103* (2013.01); *H01G 2/12* (2013.01); *H01G 9/08* (2013.01)

(58) Field of Classification Search
CPC ............ H01G 9/012; H01G 9/15; H01G 9/10; H01G 9/025; H01G 9/048; H01G 9/151
See application file for complete search history.

(56) References Cited

U.S. PATENT DOCUMENTS

| | | | | |
|---|---|---|---|---|
| 6,083,628 A * | 7/2000 | Yializis | ............... | B05D 1/60 428/461 |
| 9,545,008 B1 * | 1/2017 | Zednicek | ............... | H01G 9/15 |
| 9,758,695 B2 * | 9/2017 | Hong | ............... | H01G 4/30 |
| 2006/0076541 A1 * | 4/2006 | Yoshida | ............... | C08L 65/00 252/500 |
| 2007/0218228 A1 * | 9/2007 | Kwok | ............... | B32B 27/08 428/35.7 |
| 2010/0020469 A1 * | 1/2010 | Kurioka | ............... | H01G 4/018 361/321.1 |
| 2011/0096467 A1 * | 4/2011 | Taketani | ............... | H01G 9/012 361/528 |
| 2013/0286480 A1 * | 10/2013 | Hirota | ............... | G02B 5/3083 359/492.01 |
| 2014/0268500 A1 * | 9/2014 | Chen | ............... | H01G 9/151 361/523 |

\* cited by examiner

Primary Examiner — Nguyen T Ha
(74) Attorney, Agent, or Firm — Li & Cai Intellectual Property (USA) Office

(57) ABSTRACT

The instant disclosure provides a capacitor package structure including a capacitor unit, a first enclosing layer and a second enclosing layer. The capacitor unit includes a capacitor, a first conductive pin and a second conductive pin. The first enclosing layer encloses the entire capacitor, a part of the first conductive pin and a part of the second conductive pin. The second enclosing layer encloses the entire first enclosing layer, a part of the first conductive pin and a part of the second conductive pin. One of the first enclosing layer and the second enclosing layer is a package gel formed by a package material, and another one of the first enclosing layer and the second enclosing layer is a moisture and air resistant film formed by a moisture and air resistant material.

12 Claims, 6 Drawing Sheets

CAPACITOR PACKAGE STRUCTURE

BACKGROUND

1. Technical Field

The instant disclosure relates to a package structure, in particular, to a capacitor package structure.

2. Description of Related Art

Capacitors are widely used in consumer appliances, computers, power supplies, communication products and vehicles, and hence, are important elements for electronic devices. The main effects of the capacitors are filtering, bypassing, rectification, coupling, decoupling and phase inverting, etc. Based on different materials and uses thereof, capacitors can be categorized into aluminum electrolytic capacitors, tantalum electrolytic capacitors, laminated ceramic capacitors and thin film capacitors. In the existing art, solid electrolytic capacitors have the advantages of small size, large capacitance and excellent frequency property and can be used in the decoupling of the power circuits of central processing units. However, the moisture resistance and air resistance of the existing capacitor package structures need to be improved.

SUMMARY

The object of the instant disclosure is to provide a capacitor package structure for overcoming the disadvantages in the existing art.

An embodiment of the instant disclosure provides a capacitor package structure including a capacitor unit, a moisture and air resistant film and a packaging gel. The capacitor unit includes a capacitor, and a first conductive pin and a second conductive pin both electrically connected to the capacitor. The moisture and air resistant film completely encloses the capacitor. The packaging gel completely encloses the moisture and air resistant film. The first conductive pin has a first embedded portion extending from the capacitor and enclosed by the moisture and air resistant film and the packaging gel and a first exposed portion connected to the first embedded portion and exposed from the packaging gel, the second conductive pin has a second embedded portion extending from the capacitor and enclosed by the moisture and air resistant film and the packaging gel and a second exposed portion connected to the second embedded portion and exposed from the packaging gel.

Another embodiment of the instant disclosure provides a capacitor package structure including a capacitor unit, a packaging gel and a moisture and air resistant film. The capacitor unit includes a capacitor, and a first conductive pin and a second conductive pin both electrically connected to the capacitor. The packaging gel completely encloses the capacitor. The moisture and air resistant film completely encloses the packaging gel. The first conductive pin has a first embedded portion extending from the capacitor and enclosed by the moisture and air resistant film and the packaging gel and a first exposed portion connected to the first embedded portion and exposed from the moisture and air resistant film, and the second conductive pin has a second embedded portion extending from the capacitor and enclosed by the moisture and air resistant film and the packaging gel and a second exposed portion connected to the second embedded portion and exposed from the moisture and air resistant film. The moisture and air resistant film has a first moisture and air resistant structure surroundingly connected to the first embedded portion of the first conductive pin a second moisture and air resistant structure surroundingly connected to the second embedded portion of the second conductive pin.

Still another embodiment of the instant disclosure provides a capacitor package structure including a capacitor unit, a first enclosing layer and a second enclosing layer. The capacitor unit includes a capacitor, and a first conductive pin and a second conductive pin both electrically connected to the capacitor. The first enclosing layer enclosing the entire capacitor, a part of the first conductive pin and a part of the second conductive pin. The second enclosing layer enclosing the entire first enclosing layer, a part of the first conductive pin and a part of the second conductive pin. One of the first enclosing layer and the second enclosing layer is a packaging gel formed by a packaging material, and the other one of the first enclosing layer and the second enclosing layer is a moisture and air resistant film formed by a moisture and air resistant material. The first conductive pin has a first embedded portion extending from the capacitor and enclosed by the moisture and air resistant film and the packaging gel and a first exposed portion connected to the first embedded portion and exposed from the second enclosing layer, and the second conductive pin has a second embedded portion extending from the capacitor and enclosed by the moisture and air resistant film and the packaging gel and a second exposed portion connected to the second embedded portion and exposed from the second enclosing layer.

The advantage of the instant disclosure is that based on the technical features of "the first enclosing layer enclosing the entire capacitor, a part of the first conductive pin and a part of the second conductive pin; and the second enclosing layer enclosing the entire first enclosing layer, a part of the first conductive pin and a part of the second conductive pin" and "one of the first enclosing layer and the second enclosing layer is a packaging gel formed by a packaging material, and the other one of the first enclosing layer and the second enclosing layer is a moisture and air resistant film formed by a moisture and air resistant material", the capacitor package structure provided by the instant disclosure can enhance the overall moisture resistance and air resistance, and the lifetime of the capacitor package structure can be prolonged.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
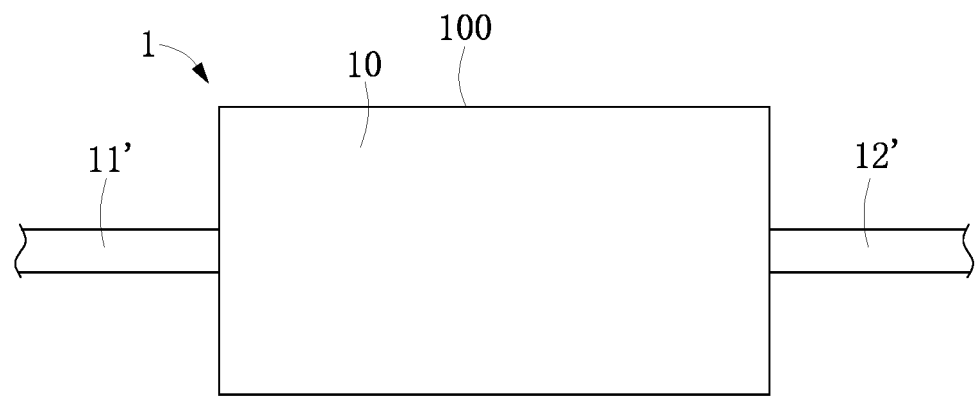
FIG. 1 is a sectional schematic view of the capacitor units of the first and second embodiments of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

First Embodiment

Reference is made to FIG. 1 to FIG. 5. The first embodiment of the instant disclosure provides a method for manufacturing a capacitor package structure Z including the following steps.

Figure 2:
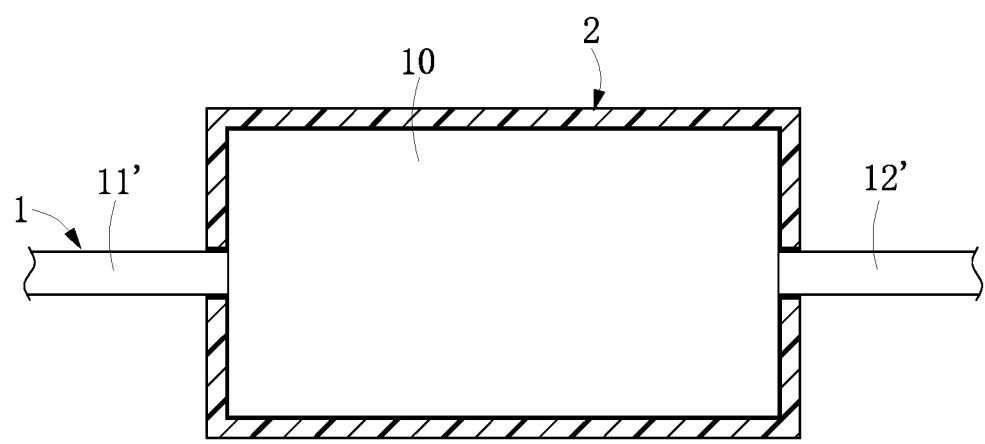
FIG. 2 is a sectional schematic view showing the step of forming a moisture and air resistant film completely enclosing a capacitor in the first embodiment of the instant disclosure.
Figure 3:
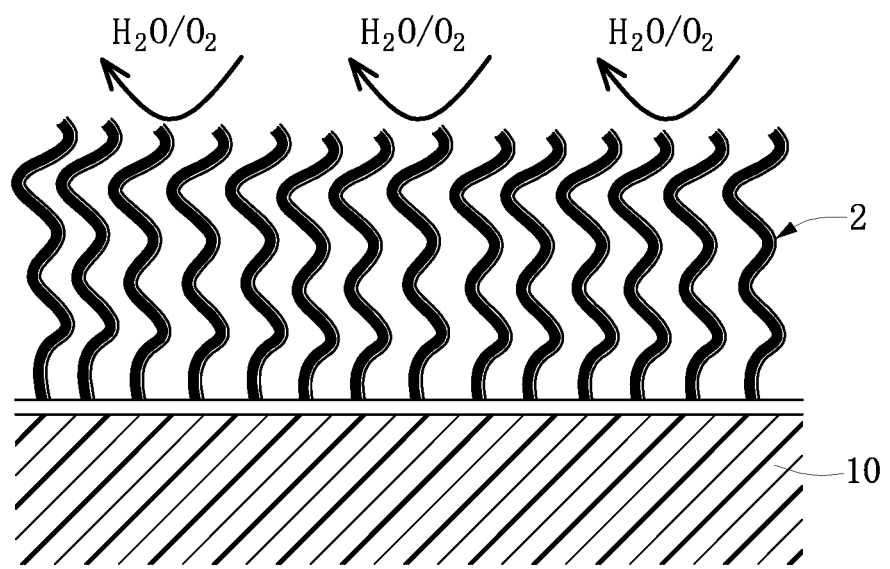
FIG. 3 is a sectional schematic view showing the step of forming a moisture and air resistant film on the capacitor in the first embodiment of the instant disclosure.
Figure 4:
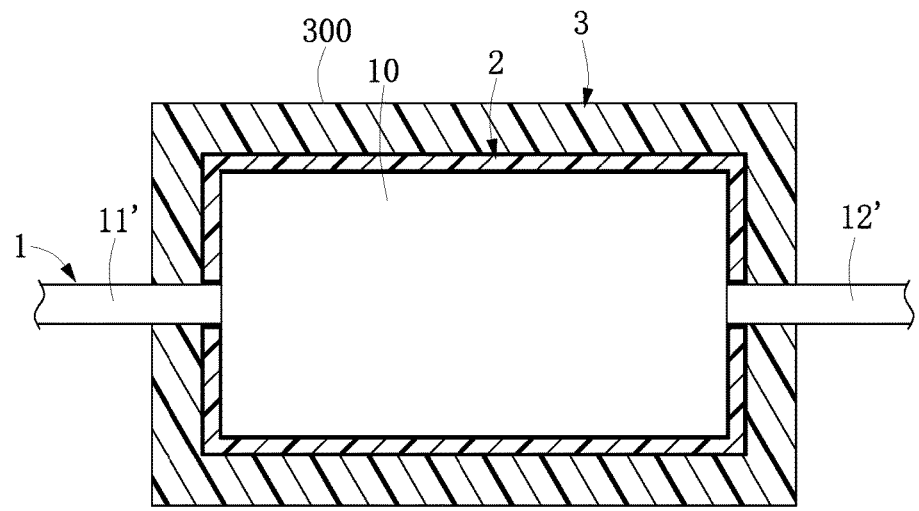
FIG. 4 is a sectional schematic view showing the step of forming a packaging gel completely enclosing the moisture and air resistant film in the first embodiment of the instant disclosure.
Figure 5:
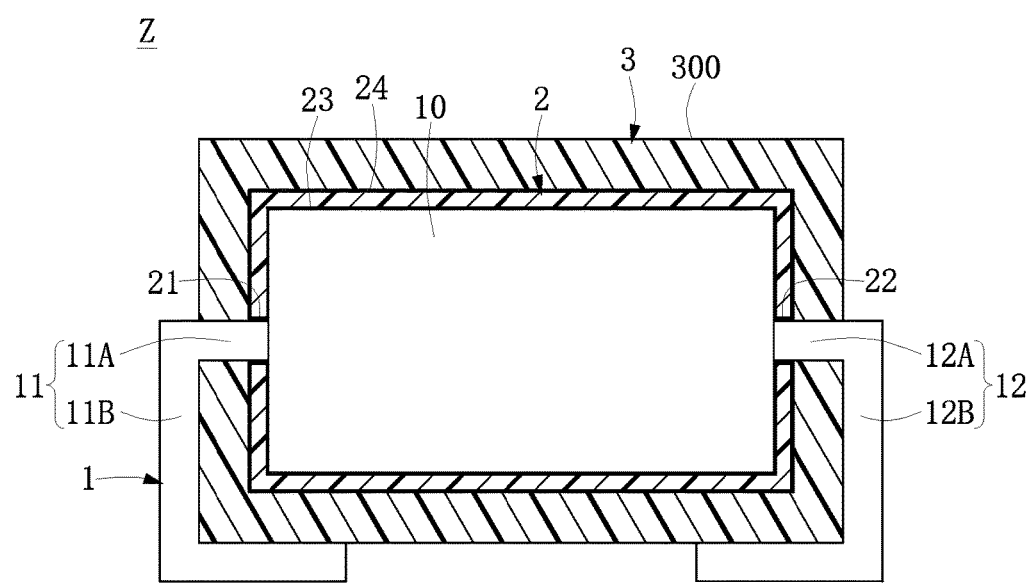
FIG. 5 is a sectional schematic view showing the step of bending a first conductive pin and a second conductive pin for enabling the first and second conductive pins to extend along an outer surface of the packaging gel in the first embodiment of the instant disclosure.

First of all, as shown in FIG. 1, a capacitor unit 1 is provided. The capacitor unit 1 includes a capacitor 10, a first conductive pin 11' electrically connected to the capacitor 10 and a second conductive pin 12' electrically connected to the capacitor 10. Next, as shown in FIG. 1 to FIG. 3, the method includes forming a moisture and air resistant film 2 for completely enclosing the capacitor 10. As shown in FIG. 2 and FIG. 4, the method includes forming a package gel 3 for completely enclosing the moisture and air resistant film 2. Lastly, as shown in FIG. 4 and FIG. 5, the method includes bending the first conductive pin 11' and the second conductive pin 12' for enabling the first conductive pin 11 and the second conductive pin 12 to extend along an outer surface 300 of the package gel 3.

For example, the moisture and air resistant film 2 shown in FIG. 1 to FIG. 3 can be a self-assembly monolayer film having a hydrophobic chain, and the self-assembly monolayer film can be formed by a dip coating or a vapor deposition process on an outer surface 100 of the capacitor 10.

In another example, the moisture and air resistant film 2 shown in FIG. 1 to FIG. 3 can be a self-assembly monolayer film having a silane coupling agent, and the self-assembly monolayer film can be formed by a dip coating or a vapor deposition process on the outer surface 100 of the capacitor 10.

Specifically, in the embodiments of the instant disclosure, the moisture and air resistant film 2 can at least include a compound having the following general formula: R1-R2, wherein R1 is selected from a group consisting of a carboxyl group, a acyl chloride group, a silyl ether group, a silanol group, a chloro silane group and a thiol group, and R2 is selected from a group consisting of a C3-C22 alkyl group, a benzyl group, a C1-C3 alkyl fluoride group, a carboxyl ester group and an epoxy group. In other words, the self-assembly monolayer included in the moisture and air resistant film 2 of the embodiment of the instant disclosure includes a combination of a chemically-stable, heat-stable and hydrophobic functional group (R2) and a functional group with chemical-reactivity and self-assembly property or can form specific chemical bonds with the surface of a substrate (R1), and hence, the moisture and air resistant film 2 can have the property of isolating the gas (air) or moisture from an outside environment and achieve the effect of moisture and air resistance. In addition, the lifetime of the capacitor package structure Z including the moisture and air resistant film 2 having the general formula as above is significantly prolonged.

In yet another example, the moisture and air resistant film 2 shown in FIG. 1 to FIG. 3 can be a self-assembly monolayer film having 1-octanethiol, benzoic acid, benzoyl chloride, 5,5,5-trifluoropentanoic acid, trimethoxy(octadecyl)silane), 3-glycidoxypropyl trimethoxysilane or octanoyl chloride, and the self-assembly monolayer film is formed on the outer surface 100 of the capacitor 10 by a dip-coating process or a vapor deposition process.

Specifically, a self-assembly monolayer (SAM) is a two-dimensional film which can self-assemble (attach) to the surface of a solid by the specific interaction between the functional group thereof and the solid substrate. Therefore, the self-assembly monolayer can spontaneously attach to a surface of a solid carrier by the specific force between the molecule thereof and the solid substrate, thereby forming a compact molecular film with an ordered structure. The moisture and air resistant film 2 is not limited to the self-assembly monolayer film listed (exemplified) as above.

Therefore, in the first embodiment of the instant disclosure, a capacitor package structure Z can be manufactured by the steps mentioned above. As shown in FIG. 5, the first embodiment further provides a capacitor package structure Z including a capacitor unit 1, a moisture and air resistant film 2 and a package gel 3.

As shown in FIG. 5, the capacitor unit 1 includes a capacitor 10, a first conductive pin 11 electrically connected to the capacitor 10 and a second conductive pin 12 electrically connected to the capacitor 10. The moisture and air resistant film 2 encloses the entire capacitor 10 (the moisture and air resistant film 2 completely encloses the capacitor 10), and the package gel 3 encloses the entire moisture and air resistant film 2 (the package gel 3 completely encloses the moisture and air resistant film 2). For example, the first conductive pin 11 and the second conductive pin 12 are a positive pin and a negative pin respectively.

Furthermore, as shown in FIG. 5, the first conductive pin 11 has a first embedded portion 11A extending from the capacitor 10 and enclosed by the moisture and air resistant film 2 and the package gel 3, and a first exposed portion 11B connected to the first embedded portion 11A and exposed from the package gel 3. The second conductive pin 12 has a second embedded portion 12A extending from the capacitor 10 and enclosed by the moisture and air resistant film 2 and the package gel 3, and a second exposed portion 12B connected to the second embedded portion 12A and exposed from the package gel 3.

It should be noted that as shown in FIG. 5, the moisture and air resistant film 2 has a first moisture and air resistant structure 21 surroundingly connected to the first embedded portion 11A of the first conductive pin 11, and a second moisture and air resistant structure 22 surroundingly connected to the second embedded portion 12A of the second conductive pin 12. In addition, the inner surface of the moisture and air resistant film 2 has a third moisture and air resistant structure 23 completely covering the outer surface 100 of the capacitor 10. The outer surface of the moisture and air resistant film 2 has a fourth moisture and air resistant structure 24 completely covered by the moisture and packaging gel 3.

Therefore, the capacitor package structure Z provided by the first embodiment of the instant disclosure can prevent water ($H_2O$) or oxygen ($O_2$) from penetrating the moisture and air resistant film 2 or the connecting surface between the moisture and air resistant film 2 and the first conductive pin 11 (or the second conductive pin 12) and contacting the capacitor 10 by the technical features of "the moisture and air resistant film 2 completely encloses the capacitor 10" and "the package gel 3 completely encloses the moisture and air resistant film 2", thereby improving the overall moisture resistance and air resistance of the capacitor package structure Z and prolonging the lifetime of the capacitor package structure Z.

Second Embodiment

Reference is made to FIG. 1 and FIG. 6 to FIG. 9. The second embodiment of the instant disclosure provides a method for manufacturing a capacitor package structure Z including the following steps.

Figure 6:
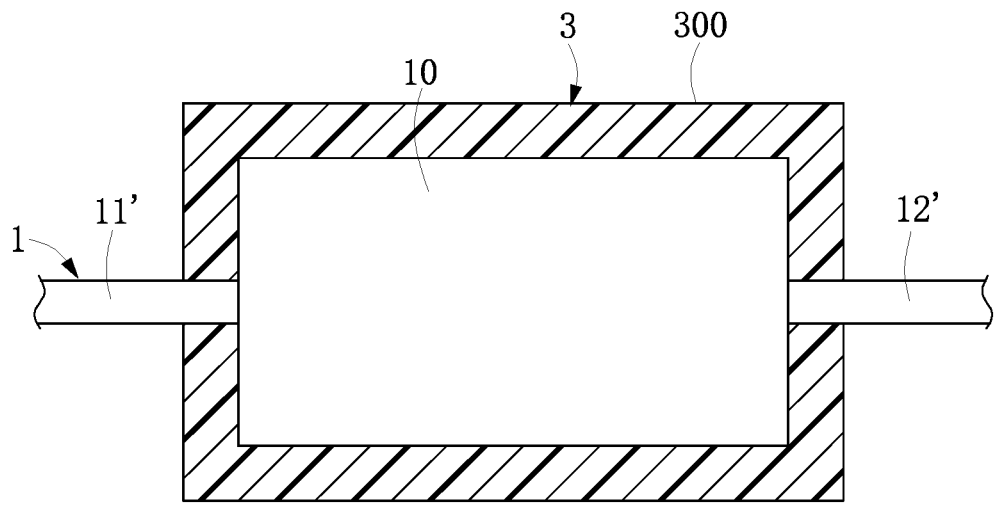
FIG. 6 is a sectional schematic view showing the step of forming a packaging gel for completely enclosing the capacitor in the second embodiment of the instant disclosure.
Figure 7:
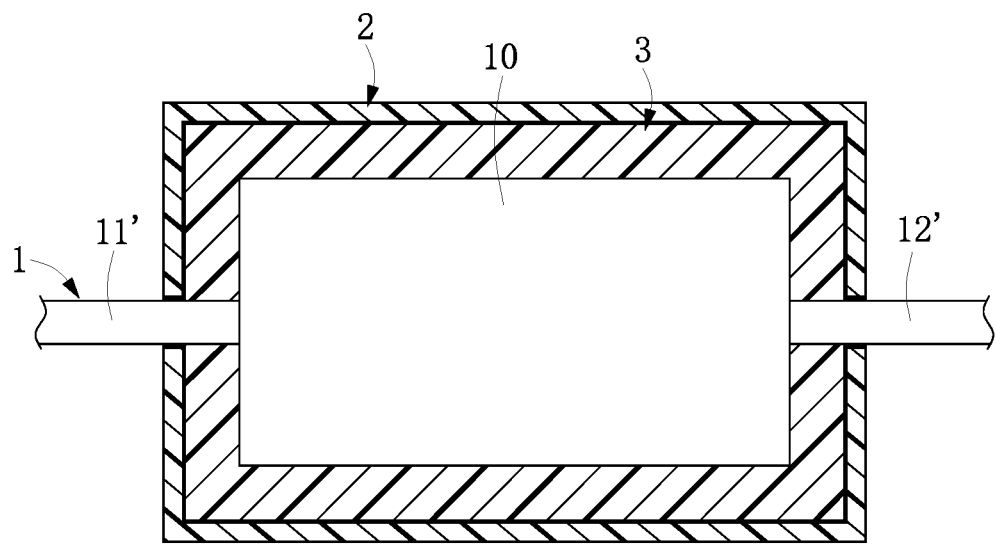
FIG. 7 is a sectional schematic view showing the step of forming a moisture and air resistant film for completely enclosing the packaging gel in the second embodiment of the instant disclosure.
Figure 8:
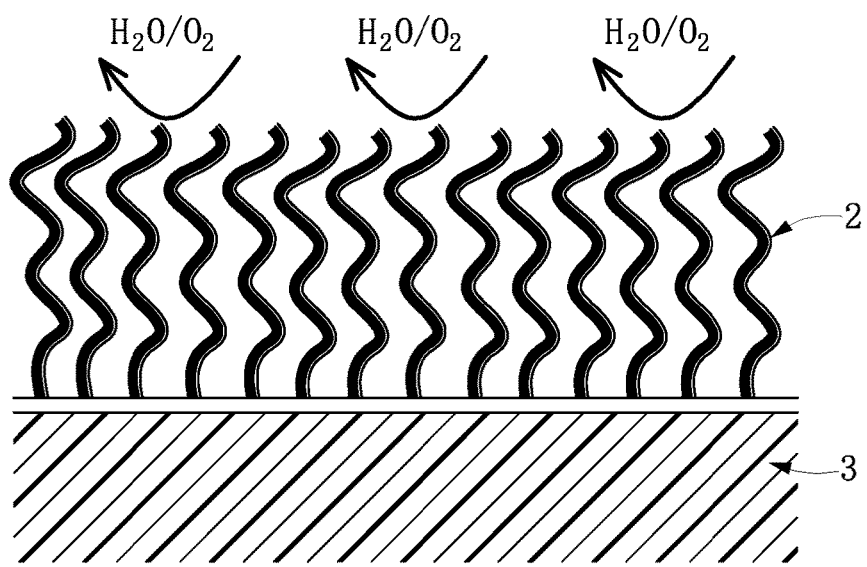
FIG. 8 is a sectional schematic view showing the moisture and air resistant film formed on the packaging gel in the second embodiment of the instant disclosure.
Figure 9:
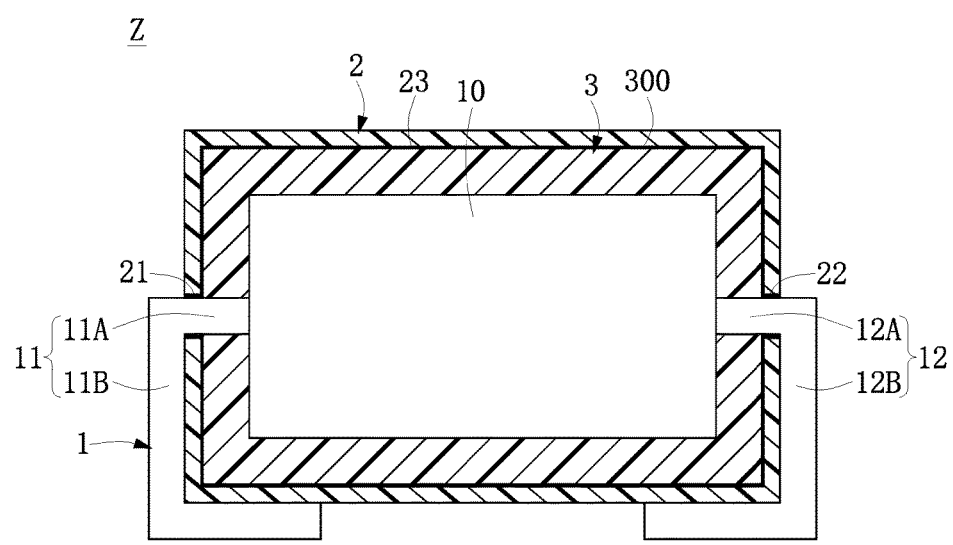
FIG. 9 is a sectional schematic view showing the step of bending a first conductive pin and a second conductive pin for enabling the first and second conductive pins to extend along an outer surface of the packaging gel in the second embodiment of the instant disclosure

First of all, as shown in FIG. 1, the method includes providing a capacitor unit 1 including a capacitor 10, a first conductive pin 11' electrically connected to the capacitor 10 and a second conductive pin 12' electrically connected to the capacitor 10. Next, as shown in FIG. 1 and FIG. 6, the method includes forming a package gel 3 for completely enclosing the capacitor 10. Next, as shown in FIG. 6 to FIG. 8, the method includes forming a moisture and air resistant film 2 for completely enclosing the package gel 3. Lastly, as shown in FIG. 7 and FIG. 9, the method includes bending the first conductive pin 11' and the second conductive pin 12' for enabling the first conductive pin 11 and the second conductive pin 12 to extend along the outer surface 300 of the package gel 3.

In an example, the moisture and air resistant film 2 shown in FIG. 6 to FIG. 8 can be a self-assembly monolayer film having a hydrophobic chain, and the self-assembly monolayer film can be formed by a dip coating or a vapor deposition process on the outer surface 300 of the packaging gel 3.

In another example, the moisture and air resistant film 2 shown in FIG. 6 to FIG. 8 can be a self-assembly monolayer film having a silane coupling agent, and the self-assembly monolayer film can be formed by a dip coating or a vapor deposition process on the outer surface 300 of the packaging gel 3.

Specifically, in the embodiments of the instant disclosure, the moisture and air resistant film 2 can at least include a compound having the following general formula: R1-R2, wherein R1 and R2 are the same as those mentioned in the first embodiment. In yet another example, the moisture and air resistant film 2 shown in FIG. 6 to FIG. 8 can be a self-assembly monolayer film having 1-octanethiol, benzoic acid, benzoyl chloride, 5,5,5-trifluoropentanoic acid, trimethoxy(octadecyl)silane), 3-glycidoxypropyl trimethoxysilane or octanoyl chloride, and the self-assembly monolayer film is formed on the outer surface 300 of the packaging gel 3 by a dip-coating process or a vapor deposition process.

Specifically, a self-assembly monolayer (SAM) is a two-dimensional film which can self-assemble (attach) to the surface of a solid by the specific interaction between the functional group of the organic molecule thereof and the solid substrate. Therefore, the self-assembly monolayer can spontaneously attach to a surface of a solid carrier by the specific force between the molecule thereof and the solid substrate, thereby forming a compact molecular film with an ordered structure. The moisture and air resistant film 2 is not limited to the self-assembly monolayer film listed as above.

Therefore, the second embodiment of the instant disclosure can provide a capacitor package structure Z by the method mentioned above. In other words, as shown in FIG. 9, the second embodiment of the instant disclosure further provides a capacitor package structure Z including a capacitor unit 1, a moisture and air resistant film 2 and a package gel 3.

As shown in FIG. 9, the capacitor unit 1 includes a capacitor 10, a first conductive pin 11 electrically connected to the capacitor 10 and a second conductive pin 12 electrically connected to the capacitor 10. In addition, the package gel 3 completely encloses the capacitor 10 and the moisture and air resistant film 2 completely encloses the package gel 3.

In addition, as shown in FIG. 9, the first conductive pin 11 has a first embedded portion 11A extending from the capacitor 10 and enclosed by the moisture and air resistant film 2 and the package gel 3, and a first exposed portion 11B connected to the first embedded portion 11A and exposed from the moisture and air resistant film 2. The second conductive pin 12 has a second embedded portion 12A extending from the capacitor 10 and enclosed by the moisture and air resistant film 2 and the package gel 3, and a second exposed portion 12B connected to the second embedded portion 12A and exposed from the moisture and air resistant film 2.

It should be noted that as shown in FIG. 9, the moisture and air resistant film 2 has a first moisture and air resistant structure 21 surroundingly connected to the first embedded portion 11A of the first conductive pin 11, and a second moisture and air resistant structure 22 surroundingly connected to the second embedded portion 12A of the second conductive pin 12. In addition, the inner surface of the moisture and air resistant film 2 has a third moisture and air resistant structure 23 completely covering the outer surface 300 of the package gel 3.

Therefore, the capacitor package structure Z provided by the second embodiment of the instant disclosure can prevent water ($H_2O$) or oxygen ($O_2$) from penetrating the moisture and air resistant film 2 or the connecting surface between the moisture and air resistant film 2 and the first conductive pin 11 (or the second conductive pin 12) and contacting the capacitor 10 by the technical features of "the package gel 3 completely encloses the '10'" and "the moisture and air resistant film 2 completely encloses the '3'", thereby improving the overall moisture resistance and air resistance of the capacitor package structure Z and prolonging the lifetime of the capacitor package structure Z.

The following experimental examples are provided for illustrating the implementation of the first and second embodiments.

First Experimental Example

In the first experimental example, as described in the first embodiment, a moisture and air resistant film 2 for completely enclosing the capacitor 10 is formed before forming the package gel 3. In other words, in the first experimental example, the capacitor 10 is immersed in a water-resistant chemical solution for 2 minutes then baked under 80° C. for 1 hour to form the moisture and air resistant film 2. After the package gel 3 is formed, the capacitor product is tested.

The water-resistant chemical solution includes 1-octanethiol $(CH_3(CH_2)_6CH_2SH)$ dissolved in methanol (MeOH). In addition, in the first experimental example, a plurality of capacitors 10 are immersed in chemical solutions having concentrations of 0.5 vol %, 1 vol % and 1.5 vol %. In addition, capacitors 10 without immersing into the chemical solution are taken as the reference sample. The test is carried out using 10 pieces (pcs) of capacitors for the chemical solutions having different concentrations and the reference sample.

A moisture resistant test and a high temperature direct current (DC) test are carried out on the capacitors 10 for obtaining the variation of capacitance (ΔCap) and the dissipation factor (DF) under different conditions. The results are shown in the tables below. In the tables, Cap represents the capacitance, DF represents the dissipation factor and ΔCap represents the variation between the capacitance at the initial state and the capacitance after the capacitor 10 is disposed for a period of time under a testing condition.

Moisture-Resistant Test

|  | initial value | | after 8 hrs under 85° C./85% RH | | |
|---|---|---|---|---|---|
|  | Cap (µF) | DF (%) | Cap (µF) | ΔCap (%) | DF (%) |
| reference sample | 339 ± 2.8 | 1.34 ± 0.15 | 353 ± 5.5 | 4.63 ± 1.6 | 1.60 ± 0.35 |
| 0.5 vol % | 314 ± 3.0 | 0.83 ± 0.10 | 323 ± 5.0 | 2.86 ± 1.6 | 0.98 ± 0.22 |
| 1 vol % | 334 ± 4.4 | 0.98 ± 0.05 | 343 ± 4.5 | 2.69 ± 1.3 | 1.04 ± 0.05 |
| 1.5 vol % | 338 ± 2.3 | 1.36 ± 0.14 | 346 ± 2.9 | 2.36 ± 0.9 | 1.37 ± 0.17 |

High Temperature DC Test

|  | initial value | | DC loading test under 105° C., 2000 hrs | | |
|---|---|---|---|---|---|
|  | Cap (µF) | DF (%) | Cap (µF) | ΔCap (%) | DF (%) |
| reference sample | 300.4 | 1.19 | 270.0 | −10.12% | 0.98 |
| 0.5 vol % | 297.2 | 0.77 | 276.4 | −7.00% | 1.05 |
| 1 vol % | 293.3 | 1.28 | 277.6 | −5.26% | 1.23 |
| 1.5 vol % | 302.6 | 0.97 | 289.5 | −4.33% | 0.98 |

Based on the results shown in the table, for the products formed by a method including an inner film coating step performed before a package gel 3 forming step, the moisture resistant property of the products increases as the concentration of the water-resistant chemical solution increases. In other words, the moisture resistant test shows that the increase of the capacitance (ΔCap) of the products having the moisture and air resistant film 2 formed by the water-resistant chemical solutions is smaller than that of the products without having the moisture and air resistant film 2 (the reference sample). In addition, as the concentration of the water-resistant chemical solution increases, the attenuation of the capacitance decreases. In other words, the high temperature DC test shows that the reduction of the capacitance of the products having the moisture and air resistant film 2 formed by the water-resistant chemical solution is smaller than that of the reference sample without having the moisture and air resistant film 2.

Second Experimental Example

In the second experimental example, as described in the second embodiment, the method for forming a capacitor 10 includes forming the package gel 3 for completely enclosing the capacitor 10 before forming the moisture and air resistant film 2 for completely enclosing the package gel 3. In other words, in the second experimental example, the capacitor 10 is immersed in the water-resistant chemical solution for 5 minutes after the capacitor 10 is packaged, then is baked for 2 hours under 125° C. for forming the moisture and air resistant film 2. Next, the products are tested.

The water-resistant chemical solution includes 3-glycidoxypropyl trimethoxysilane (the structural formula thereof is shown below) dissolved in ethanol (EtOH). In addition, a plurality of capacitors 10 is immersed in water-resistant chemical solutions having concentrations of 1 vol %, 2 vol % and 3 vol %. In addition, capacitors 10 without immersing into the chemical solution are taken as the reference sample. The test is carried out using 10 pieces (pcs) of capacitors for the chemical solutions having different concentrations and the reference sample.

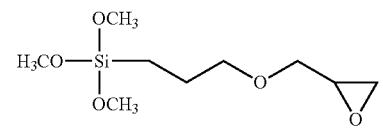

3-Glycidoxypropyl trimethoxysilane

A moisture resistant test and a high temperature direct current (DC) test are carried out on the capacitors 10 for obtaining the variation of capacitance (ΔCap) and the dissipation factor (DF). The results are shown in the tables below. In the tables, Cap represents the capacitance, DF represents the dissipation factor and ΔCap represents the variation between the capacitance at the initial state and the capacitance after the capacitor 10 is disposed for a period of Moisture-Resistant Test

|  | initial value | | after 8 hrs under 85° C./85% RH | | |
| --- | --- | --- | --- | --- | --- |
|  | Cap (μF) | DF (%) | Cap (μF) | ΔCap (%) | DF (%) |
| reference sample | 419 ± 3.2 | 1.07 ± 0.19 | 430 ± 5.8 | 2.55 ± 1.0 | 1.18 ± 0.27 |
| 1 vol % | 424 ± 3.6 | 1.05 ± 0.11 | 433 ± 4.3 | 2.11 ± 1.06 | 1.12 ± 0.14 |
| 2 vol % | 418 ± 4.4 | 0.99 ± 0.16 | 424 ± 4.5 | 1.50 ± 0.4 | 1.12 ± 0.28 |
| 3 vol % | 425 ± 5.0 | 1.04 ± 0.07 | 433 ± 4.9 | 1.75 ± 0.2 | 1.09 ± 0.07 |

High Temperature DC Test

|  | initial value | | DC loading test under 105° C., 2000 hrs | | |
| --- | --- | --- | --- | --- | --- |
|  | Cap (μF) | DF (%) | Cap (μF) | ΔCap (%) | DF (%) |
| reference sample | 438 | 1.35 | 358 | −16.9 | 2.15 |
| 1 vol % | 437 | 1.42 | 365 | −16.1 | 2.44 |
| 2 vol % | 432 | 1.35 | 391 | −9.3 | 1.88 |
| 3 vol % | 433 | 1.38 | 401 | −7.4 | 1.60 |

Based on the results shown in the table, for the products formed by a method including a packaging step performed before a moisture and air resistant film 2 forming step, as the concentration of the water-resistant chemical solution increases, the moisture resistance of the product increases. In addition, as the concentration of the water-resistant chemical solution increases, the air resistance of the product increases, and the attenuation of the capacitance decreases.

Therefore, according to the first experimental example and the second experimental example, the capacitor package structure Z provided by the embodiments of the instant disclosure can prevent the factors (such as moisture or air) in the outside environment from affecting the performance of the capacitor, and the lifetime of the capacitor can be prolonged.

As shown in FIG. 5 or FIG. 9, the embodiments of the instant disclosure provide a capacitor package structure Z including a capacitor unit 1, a first enclosing layer and a second enclosing layer. The capacitor unit 1 includes a capacitor 10, and a first conductive pin 11 and a second conductive pin 12 both electrically connected to the capacitor 10. The first enclosing layer completely encloses the capacitor 10, a part of the first conductive pin 11 and a part of the second conductive pin 12. The second enclosing layer completely encloses the first enclosing layer, a part of the first conductive pin 11 and a part of the second conductive pin 12.

Specifically, one of the first enclosing layer and the second enclosing layer is a packaging gel formed by a packaging material, and the other one of the first enclosing layer and the second enclosing layer is a moisture and air resistant film 2 formed by a moisture and air resistant material. In addition, the first conductive pin 11 has a first embedded portion 11A extending from the capacitor 10 and enclosed by the moisture and air resistant film 2 and the package gel 3 and a first exposed portion 11B connected to the first embedded portion 11A and exposed from the second enclosing layer. The second conductive pin 12 has a second embedded portion 12A extending from the capacitor 10 and enclosed by the moisture and air resistant film 2 and the package gel 3 and a second exposed portion 12B connected to the second embedded portion 12A and exposed from the second enclosing layer.

Therefore, the capacitor package structure Z provided by the embodiments of the instant disclosure can prevent water ($H_2O$) or oxygen ($O_2$) from penetrating the moisture and air resistant film 2 or the connecting surface between the moisture and air resistant film 2 and the first conductive pin 11 (or the second conductive pin 12) and contacting the capacitor 10 by the technical features of "the first enclosing layer completely encloses the capacitor 10, a part of the first conductive pin 11 and a part of the second conductive pin 12; and the second enclosing layer completely encloses the first enclosing layer, a part of the first conductive pin 11 and a part of the second conductive pin 12" and "one of the first enclosing layer and the second enclosing layer is a packaging gel 3 formed by a packaging material, and the other one of the first enclosing layer and the second enclosing layer is a moisture and air resistant film 2 formed by a moisture and air resistant material", thereby prolonging the lifetime of the capacitor package structure Z.

The above-mentioned descriptions represent merely the exemplary embodiment of the instant disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A capacitor package structure, including:
a capacitor unit including a capacitor, and a first conductive pin and a second conductive pin both electrically connected to the capacitor;
a moisture and air resistant film completely enclosing the capacitor, and being passed through by the first conductive pin and the second conductive pin, wherein one part of the first conductive pin and one part of the second conductive pin are exposed from the moisture and air resistant film; and
a packaging gel completely enclosing the moisture and air resistant film;
wherein the first conductive pin has a first embedded portion extending from the capacitor and enclosed by the moisture and air resistant film and the packaging gel and a first exposed portion connected to the first embedded portion and exposed from the packaging gel, and the second conductive pin has a second embedded portion extending from the capacitor and enclosed by the moisture and air resistant film and the packaging gel and a second exposed portion connected to the second embedded portion and exposed from the packaging gel.

2. The capacitor package structure according to claim 1, wherein the moisture and air resistant film is a self-assembly monolayer film having a hydrophobic chain, and the self-assembly monolayer film is formed on an outer surface of the capacitor by a dip-coating process or a vapor deposition process.

3. The capacitor package structure according to claim 1, wherein the moisture and air resistant film is a self-assembly monolayer film having a silane coupling agent, and the self-assembly monolayer film is formed on an outer surface of the capacitor by a dip-coating process or a vapor deposition process.

4. The capacitor package structure according to claim 1, wherein the moisture and air resistant film at least includes a compound having a general formula R1-R2, wherein R1 is selected from a group consisting of a carboxyl group, a acyl chloride group, a silyl ether group, a silanol group, a chloro silane group and a thiol group, and R2 is selected from a group consisting of a C3-C22 alkyl group, a benzyl group, a C1-C3 alkyl fluoride group, a carboxyl ester group and an epoxy group.

5. The capacitor package structure according to claim 1, wherein the moisture and air resistant film is a self-assembly monolayer film having at least one of the following compounds: 1-octanethiol, benzoic acid, benzoyl chloride, 5,5,5-trifluoropentanoic acid, trimethoxy(octadecyl)silane), 3-glycidoxypropyl trimethoxysilane and octanoyl chloride, and the self-assembly monolayer film is formed on an outer surface of the capacitor by a dip-coating process or a vapor deposition process.

6. The capacitor package structure according to claim 1, wherein the moisture and air resistant film has a first moisture and air resistant structure surroundingly connected to the first embedded portion of the first conductive pin and a second moisture and air resistant structure surroundingly connected to the second embedded portion of the second conductive pin, wherein the moisture and air resistant film has a third moisture and air resistant structure completely covering an outer surface of the capacitor and a fourth moisture and air resistant structure completely covered by the packaging gel.

7. A capacitor package structure, including:
a capacitor unit including a capacitor, and a first conductive pin and a second conductive pin both electrically connected to the capacitor;
a packaging gel completely enclosing the capacitor; and
a moisture and air resistant film completely enclosing the packaging gel, and being passed through by the first conductive pin and the second conductive pin, wherein one part of the first conductive pin and one part of the second conductive pin are exposed from the moisture and air resistant film;
wherein the first conductive pin has a first embedded portion extending from the capacitor and enclosed by the moisture and air resistant film and the packaging gel and a first exposed portion connected to the first embedded portion and exposed from the moisture and air resistant film, and the second conductive pin has a second embedded portion extending from the capacitor and enclosed by the moisture and air resistant film and the packaging gel and a second exposed portion connected to the second embedded portion and exposed from the moisture and air resistant film.

8. The capacitor package structure according to claim 7, wherein the moisture and air resistant film is a self-assembly monolayer film having a hydrophobic chain, and the self-assembly monolayer film is formed on an outer surface of the capacitor by a dip-coating process or a vapor deposition process.

9. The capacitor package structure according to claim 7, wherein the moisture and air resistant film is a self-assembly monolayer film having a silane coupling agent, and the self-assembly monolayer film is formed on an outer surface of the capacitor by a dip-coating process or a vapor deposition process.

10. The capacitor package structure according to claim 7, wherein the moisture and air resistant film at least includes a compound having a general formula R1-R2, wherein R1 is selected from a group consisting of a carboxyl group, a acyl chloride group, a silyl ether group, a silanol group, a chloro silane group and a thiol group, and R2 is selected from a group consisting of a C3-C22 alkyl group, a benzyl group, a C1-C3 alkyl fluoride group, a carboxyl ester group and an epoxy group.

11. The capacitor package structure according to claim 7, wherein moisture and air resistant film is a self-assembly monolayer film having at least one of the following compounds: 1-octanethiol, benzoic acid, benzoyl chloride, 5,5,5-trifluoropentanoic acid, trimethoxy(octadecyl)silane), 3-glycidoxypropyl trimethoxysilane and octanoyl chloride, and the self-assembly monolayer film is formed on an outer surface of the capacitor by a dip-coating process or a vapor deposition process.

12. A capacitor package structure, including:
a capacitor unit including a capacitor, and a first conductive pin and a second conductive pin both electrically connected to the capacitor;
a first enclosing layer enclosing the entire capacitor, a part of the first conductive pin and a part of the second conductive pin; and
a second enclosing layer enclosing the entire first enclosing layer, a part of the first conductive pin and a part of the second conductive pin;
wherein one of the first enclosing layer and the second enclosing layer is a packaging gel formed by a packaging material, and the other one of the first enclosing layer and the second enclosing layer is a moisture and air resistant film formed by a moisture and air resistant material;
wherein the first conductive pin has a first embedded portion extending from the capacitor and enclosed by the moisture and air resistant film and the packaging gel and a first exposed portion connected to the first embedded portion and exposed from the second enclosing layer, and the second conductive pin has a second embedded portion extending from the capacitor and enclosed by the moisture and air resistant film and the packaging gel and a second exposed portion connected to the second embedded portion and exposed from the second enclosing layer;
wherein the moisture and air resistant film at least includes a compound having a general formula R1-R2, wherein R1 is selected from a group consisting of a carboxyl group, a acyl chloride group, a silyl ether group, a silanol group, a chloro silane group and a thiol group, and R2 is selected from a group consisting of a C3-C22 alkyl group, a benzyl group, a C1-C3 alkyl fluoride group, a carboxyl ester group and an epoxy group.

* * * * *